United States Patent [19]
Burger

[11] 3,734,461
[45] May 22, 1973

[54] GATE VALVE WITH THIN WALLED HUBS

[75] Inventor: Harry Fred Burger, San Francisco, Calif.

[73] Assignee: Walworth Company, Bala Cynwyd, Pa.

[22] Filed: Sept. 3, 1971

[21] Appl. No.: 177,608

[52] U.S. Cl. .................................................251/366
[51] Int. Cl. ............................................F16k 27/00
[58] Field of Search.....................251/366, 367, 328, 251/193, 195

[56] References Cited

UNITED STATES PATENTS

| | | | |
|---|---|---|---|
| 3,638,908 | 2/1972 | Grove | 251/366 X |
| 3,339,886 | 9/1967 | Grove | 251/328 X |
| 2,904,306 | 9/1959 | Bryant | 251/367 |
| 2,982,514 | 5/1961 | Bryant | 251/366 X |
| 3,013,770 | 12/1961 | Anderson et al. | 251/367 X |
| 3,069,132 | 12/1962 | Grove | 251/367 X |
| 3,204,929 | 9/1965 | Bryant | 251/366 X |
| 3,481,580 | 12/1969 | Grove et al. | 251/328 |

*Primary Examiner*—Samuel Scott
*Attorney*—Melvin R. Stidham

[57] ABSTRACT

A gate valve body structure with a body tube of rectangular cross-section having flat side and end wall plates. Thick reinforcing plates are welded around the openings in the end walls, and tie plates are extended across the side walls and secured between lateral portions of the reinforcing plates. Tubular pipe sections with relatively thin walls are welded to and around circular openings in the reinforcing plates to form hubs. The tie plates may be formed from the circular portions removed from a plate to accommodate the hubs and end plate openings. Hoop-like reinforcing ribs embrace the body tube, with the pair adjacent the top and bottom portions of the reinforcing plates being secured thereto.

7 Claims, 6 Drawing Figures

FIG-3-

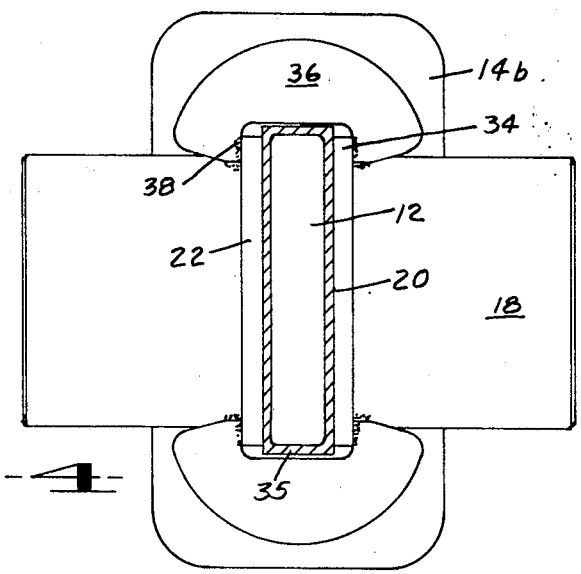
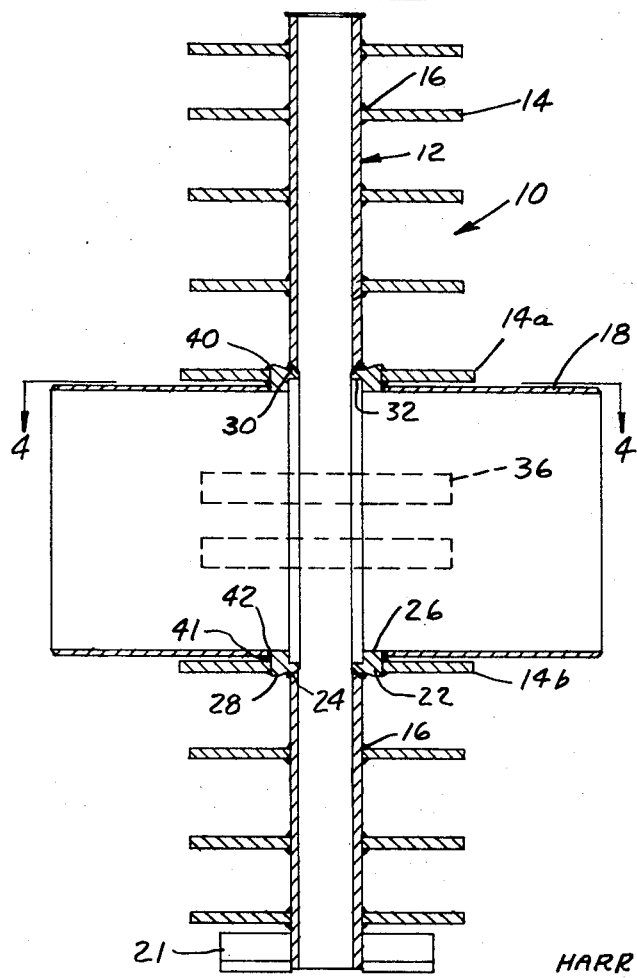

PATENTED MAY 22 1973 3,734,461
SHEET 3 OF 3
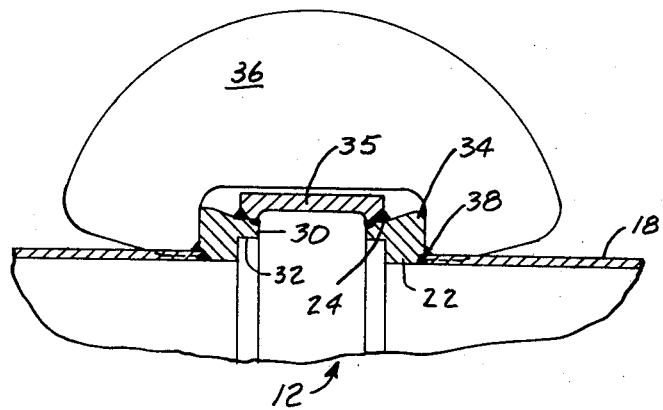
FIG-5-
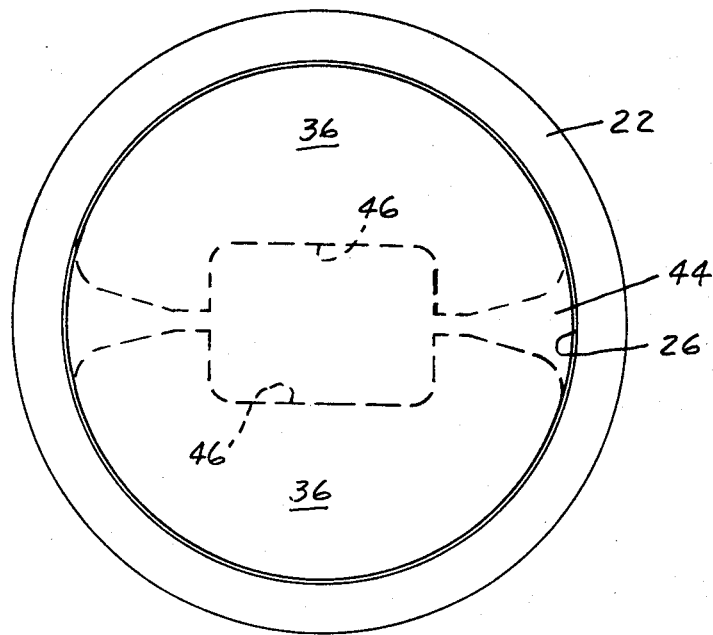
FIG-6-
INVENTOR
HARRY FRED BURGER
BY Melvin R. Stidham
ATTORNEY

GATE VALVE WITH THIN WALLED HUBS

BACKGROUND OF THE INVENTION

This invention relates to a gate valve body having thin walled hubs and, more particularly, to a gate valve body having thin walled hubs, with reinforcing plates having circular openings to accommodate the hubs being welded to the body end walls.

Gate valves such as those used in pipeline systems are commonly fabricated from rolled steel shapes, such as plates, angles and channels. For relatively high pressure installations, reinforcing ribs of various configurations were applied to the generally rectangular body tube in order to prevent distortion of the flat end and side walls under internal pressure. In the area of the hubs which connect the valves into the pipeline, such ribs could not conveniently be applied. Hence, the hubs themselves were made to function as stiffeners in this area and were made with relatively thick walls. However, the provision of such thick wall hubs resulted in material costs and, in some instances made the hubs exceedingly difficult to form.

OBJECTS OF THE INVENTION

It is an object of this invention to provide a fabricated gate valve body with hub assemblies which adequately stiffen the body despite being primarily of thin walled construction.

It is a further object of this invention to provide a fabricated gate valve body with adequate reinforcement in the area of the flow passages, but with minimum material requirement.

It is a further object of this invention to provide a fabricated gate valve body with heavy plate reinforcing hub assemblies which are simple and economical to manufacture.

It is a further object of this invention to provide a fabricated gate valve body with hub assemblies, each comprising a thick reinforcing plate section welded to a body end wall, with a thin walled pipe section being welded thereto and extended therefrom.

Other objects and advantages of this invention will become apparent from the description to follow when read in conjunction with the accompanying drawing.

BRIEF SUMMARY OF THE INVENTION

In carrying out this invention, there is provided a gate valve body with a rectangular body tube, preferably formed of rolled metal shapes, which for high pressure operation may be reinforced by a plurality of hoop-like reinforcing ribs which embrace the body tube and extend in parallel relationship throughout the height thereof. The hubs may be formed of relatively thin walled pipe to form a continuation of the pipeline into which they are connected. In order to function as stiffeners in the area surrounding the hubs and to reinforce against pipeline stresses, relatively thick annular plates are welded to the flat end walls of the tubular body. Lateral portions of the annular reinforcing plates are interconnected by tie plates extending across the side walls. In one embodiment, the tie plates may take the form of C-clamps, a pair of which are formed from each of the circles of metal which are removed from the reinforcing plates in order to accommodate the cylindrical hubs. Also, in one form of the invention, the two hoop-like reinforcing ribs which are disposed immediately adjacent the top and bottom portions of the hubs are welded directly to corresponding ones of such portions of the reinforcing plates and, in fact, may actually embrace such corresponding portions of both body plates.

BRIEF DESCRIPTION OF THE DRAWINGS

FIG. 2 is a vertical section view of the gate valve body taken along line 2—2 of FIG. 1;

FIG. 3 is a section view taken along line 3—3 of FIG. 1;

FIG. 4 is a section view taken along line 4—4 of FIG. 2;

FIG 5 is a partial section view showing the C-clamp reinforcing means forming a part of this invention; and FIG. 6 is a plan view illustrating the formation of C-clamp reinforcing means.

DETAILED DESCRIPTION OF A PREFERRED EMBODIMENT

Figure 1:
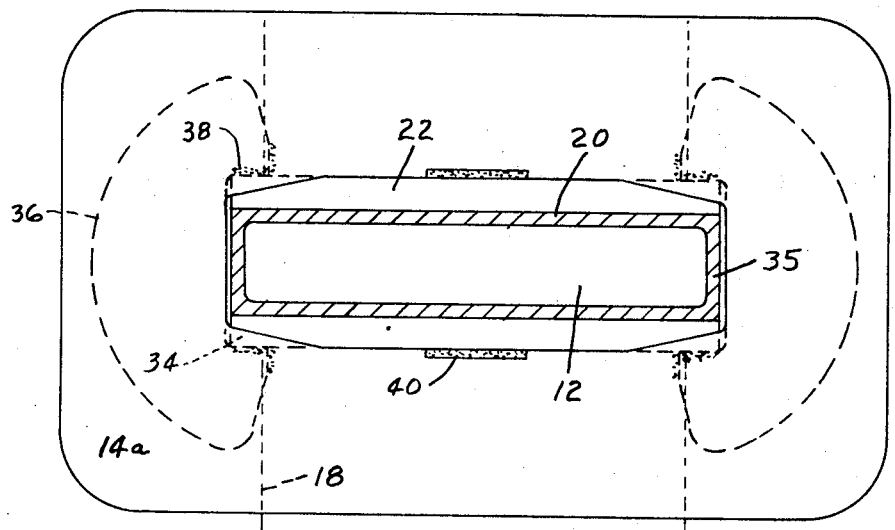
FIG. 1 is an elevation view partially broken away of a gate valve embodying features of this invention.
Figure 1:
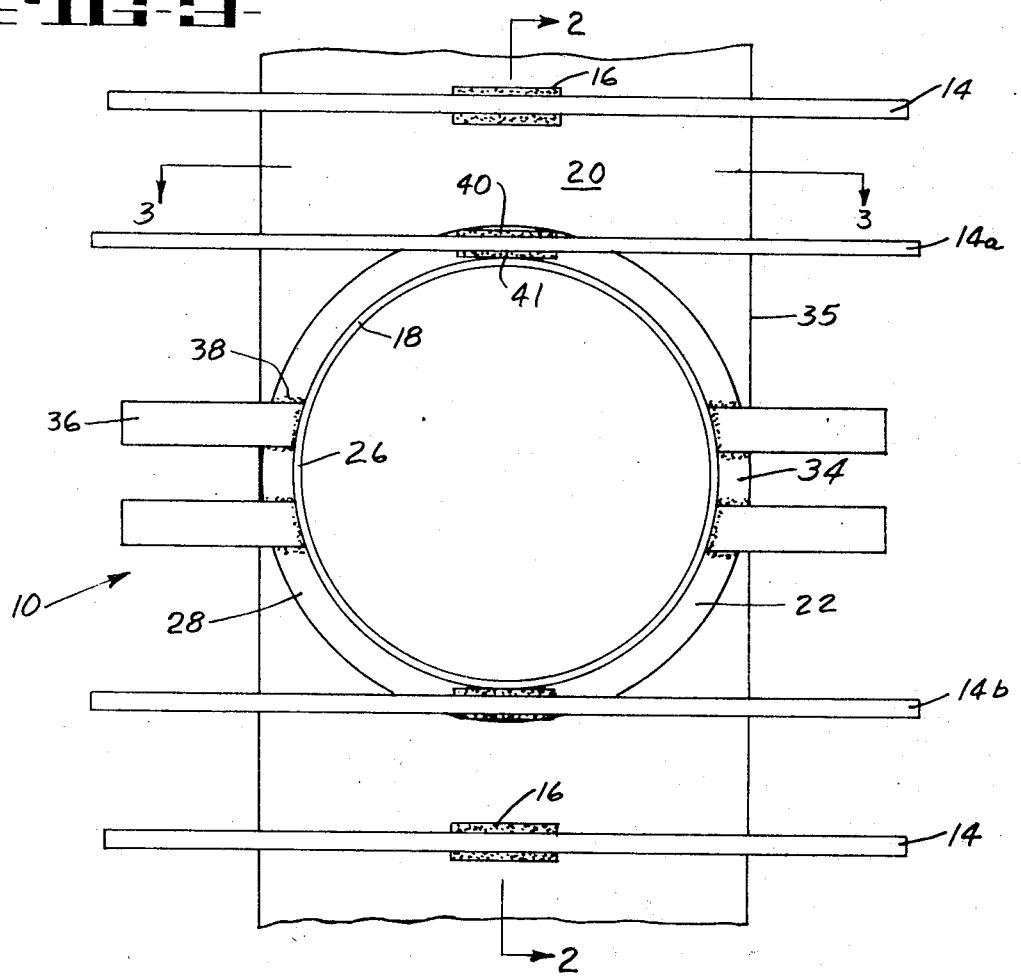

Referring now to FIGS. 1 to 4 with greater particularity, there is shown a gate valve body 10 comprising a rectangular body tube 12 which is embraced across its full height by a plurality of parallel hoop-like reinforcing ribs 14, those two 14a and 14b which are disposed immediately above and below the hubs 18 being designated the hub ribs. Preferably, the ribs 14 are welded to the body tube 12 at 16 along just a limited portion of the body tube width. The body tube 12 is preferably formed of rolled shapes such as angles, plates and channels in selected combinations. The hubs 18, which are secured to opposite end walls 20 of the body tube, are formed from relatively thin pipe sections, to form a continuation of the pipeline (not shown) to which they are to be connected, as by welding. A base 21 (FIG. 2) of angles or the like may be provided to support the body 10 during fabrication.

In order to add rigidity to the areas of the end walls 20 which surround the hubs 18, a relatively thick reinforcing body plate 22 is welded into accommodating openings 24 (FIG. 2) in the end walls 20. While the inner surfaces 26 of the reinforcing body plates 22 are preferably circular to conform to and accommodate the hub sections 18, the outer surfaces 28 may be of varying profile, and this invention is not restricted to the annular body plate form illustrated. The reinforcing body plates 22 may have cylindrical inner extensions 30, which are accommodated in the circular openings 24 and, prior to mounting, may have annular recesses 32 cut in to accommodate valve seal assemblies (not shown).

The reinforcing body plates 22 have lateral portions 34 which extend to or near the edge of the side walls 35 of the body tube 12 where they may be interconnected by suitable tie plate means 36. In the embodiment shown in FIG. 1, the tie plates 36 comprise one or more C-type members which embrace corresponding lateral portions 34 of the opposite annular reinforcing body plates 22, and are secured thereto as by tack welding at 38, simply to hold them in place. Reinforcement at the top and bottom portions of the annular plates may also be accomplished by tying them together, as by welding them to the hub ribs 14a and 14b. In fact, the hub ribs may be formed with an inner opening large enough to embrace the top and bottom edges of the annular reinforcing body plate 22 before being welded thereto at 40 and 41. The thin walled hubs 18 are welded at 42 to the reinforcing body plates 22.

Referring now to FIGS. 5 and 6, the C-type clamps or tie plates 36 present substantial cross sections outward of the reinforcing body plate 22 to resist outward deflection thereof and of the end walls 20 when the body tube 12 is under internal pressure. In securing the tie plates in position, they need merely be tack welded at 38 to the body because stresses from internal pressure will be taken in the tie plates 36 themselves, and not in the weld.

The C-clamp configuration of the tie plates is particularly convenient in connection with the manufacture of the annular reinforcing body plate 22 inasmuch as a pair of tie plates 36 may be formed from the circular drop 44, which is removed from the center 26 of the reinforcing plate 22. Thereafter, they are cut, as by burning, to the desired internal profile 46 to fit around the body tube side walls 35 and the edges 34 of the reinforcing body plate 22. Hence, they are simple to manufacture and utilize material which might otherwise be wasted.

While this invention has been described in conjunction with preferred embodiments thereof, it is obvious that modifications and changes therein may be made by those skilled in the art without departing from the spirit and scope of this invention.

What is claimed is:

1. A gate valve body comprising:
   a body tube of generally rectangular cross-section with relatively planar side and end walls,
   aligned hub openings in said end walls,
   a pair of relatively thick reinforcing rings with circular openings therein, welded in and around said hub openings,
   lateral portions on said reinforcing rings being disposed adjacent the side edges of said end walls,
   a pair of relatively thick tie plates extending across but unattached to said side walls and secured between said lateral portions, forming a unitized structure with said reinforcing rings, and
   relatively thin walled tubular hubs welded to said reinforcing rings coaxially with said circular openings.

2. The gate valve structure defined by claim 1 including:
   a first hoop-like reinforcing rib embracing said body tube and secured at opposite sides thereof to corresponding upper portions of said reinforcing rings.

3. The gate valve structure defined by claim 2 wherein:
   said first reinforcing rib embraces said corresponding upper portions.

4. The gate valve structure defined by claim 2 including:
   a second hoop-like reinforcing rib embracing said body tube parallel to said first rib and secured at opposite sides thereof to corresponding bottom portions of said reinforcing rings.

5. The gate valve structure defined by claim 4 wherein:
   said second reinforcing rib embraces said corresponding bottom portions.

6. The gate valve structure defined by claim 1 wherein:
   each of said tie plates comprises a relatively thick C-shaped plate member with an internal dimension to embrace said side walls and said lateral portions and an arcuate outer surface of a radius slightly smaller than the radius of said circular opening.

7. The gate valve structure defined by claim 6 wherein:
   there are two of said C-shaped plate members across each of said side walls and corresponding lateral portions and each is of the thickness of said reinforcing rings.

* * * * *